(12) United States Patent
Ranmuthu et al.

(10) Patent No.: US 6,366,420 B1
(45) Date of Patent: Apr. 2, 2002

(54) METHOD OF RESTORING THE ORIENTATION OF A PINNED LAYER OF A MAGNETORESISTIVE HEAD

(75) Inventors: Indumini W. Ranmuthu, Plano; Kenneth J. Maggio, Dallas, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/617,070

(22) Filed: Jul. 16, 2000

Related U.S. Application Data

(60) Provisional application No. 60/143,576, filed on Jul. 13, 1999.

(51) Int. Cl.[7] .................................................. G11B 5/03
(52) U.S. Cl. ...................... 360/66; 300/324.11; 324/252
(58) Field of Search ........................... 360/66–67, 314, 360/324.1, 324.11; 324/252

(56) References Cited

U.S. PATENT DOCUMENTS

| | | | |
|---|---|---|---|
| 5,287,238 A | 2/1994 | Baumgart et al. ............ 360/314 |
| 5,650,887 A | * 7/1997 | Dovek et al. ................. 360/75 |
| 5,856,897 A | 1/1999 | Mauri ........................ 360/314 |
| 5,859,754 A | 1/1999 | Tong et al. .................. 360/314 |
| 5,867,351 A | 2/1999 | Gill .......................... 360/324.11 |
| 5,880,913 A | 3/1999 | Gill .......................... 360/324.11 |
| 5,883,764 A | 3/1999 | Pinarbasi ..................... 360/322 |
| 5,969,523 A | * 10/1999 | Chung et al. .................. 360/66 |

* cited by examiner

*Primary Examiner*—Regina Y. Neal
(74) *Attorney, Agent, or Firm*—Bret J. Petersen; Frederick J. Telecky, Jr.

(57) ABSTRACT

Magnetoresistive, MR, heads and giant magnetoresistive, GMR, heads are used in hard disk drive storage systems. The heads have a pinned layer whose magnetic orientation, if incorrect, gives rise to data read errors. A pinned layer reset method and circuit is provided to restore the magnetic orientation of the pinned layer by applying a reset pulse to the MR head. The circuit employs the existing low frequency cutoff capacitor in the initial amplification stage of the preamplifier to charge the magnitude of the reset pulse. The magnitude of the pulse is programmable by selecting bits in the existing write current digital to analog converter. The head select input transistor applies the pulse to the MR head. The pulse width is programmable as is the discharge rate. The settling value of the pulse is determined by the existing read current digital to analog converter value. The method of the invention is applicable to preamplifiers designed as current bias preamplifiers and to preamplifiers designed as voltage bias amplifiers.

9 Claims, 3 Drawing Sheets

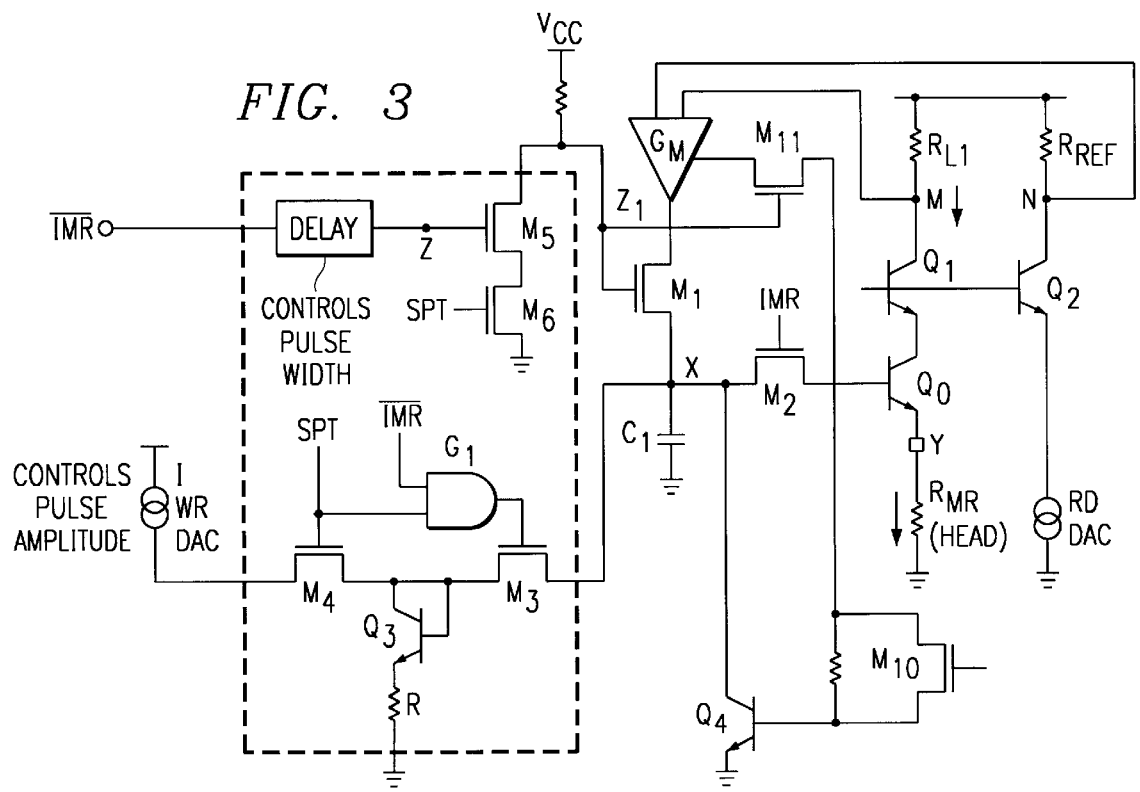
FIG. 3
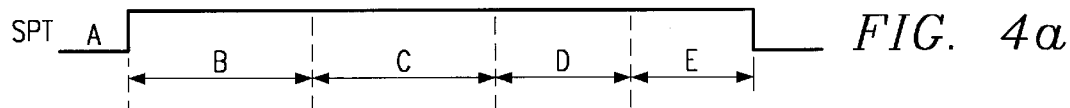
FIG. 4a
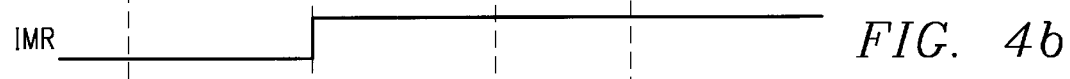
FIG. 4b
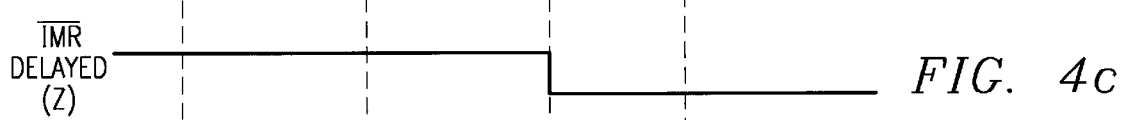
FIG. 4c
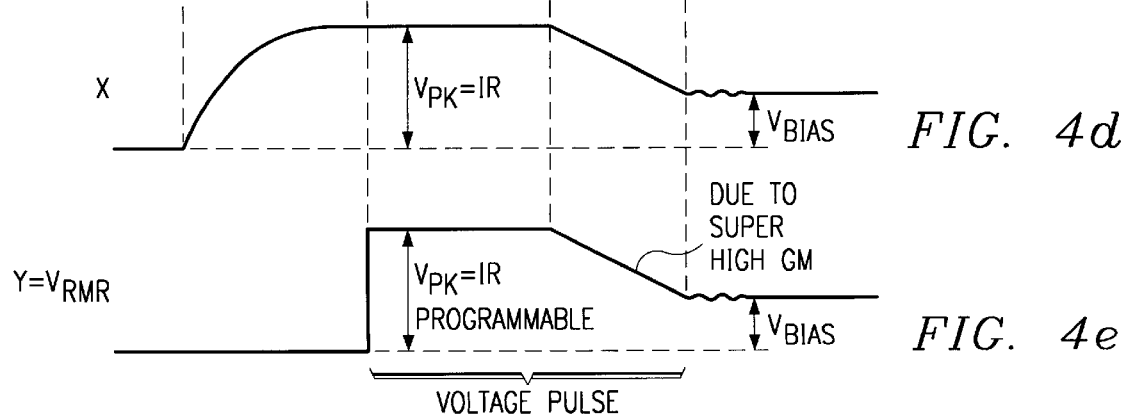
FIG. 4d
FIG. 4e

METHOD OF RESTORING THE ORIENTATION OF A PINNED LAYER OF A MAGNETORESISTIVE HEAD

This application claims priority under 35 USC §119(e)(1) of provisional application No. 60/143,576 filed Jul. 13, 1999.

FIELD OF THE INVENTION

The invention relates generally to the field of information storage, more specifically to hard disk drives and in particular to preamplifier circuits.

BACKGROUND OF THE INVENTION

U.S. Pat. No. 5,831,888 entitled "Automatic Gain Control Circuit" and assigned to Texas Instruments Incorporated, the assignee of the present invention, sets forth generally the description of disk storage. Hard disk drives (HDD) are one type of disk storage that are particularly used in personal computers today. The HDD device generally includes a magnetic storage media, such as rotating disks or platters, a spindle motor, read/write heads, an actuator, a preamplifier, a read channel, a write channel, a servocontroller, a memory and control circuitry to control the operation of the HDD and to properly interface the HDD to a host or system bus. The following U.S. Patents describe various aspects of HDD devices:

| | | |
|---|---|---|
| 5,535,067 | Frequency Controlled Reference Generator | Issued 07/09/96 |
| 5,570,241 | Single Channel, Multiple Head Servo... | 10/29/96 |
| 5,862,005 | Synchronous Detection Of Wide BI-Phase... | 01/19/99 |
| 5,793,559 | In Drive Correction Of Servo Pattern... | 08/11/98 |
| 5,719,719 | Magnetic Disk Drive With Sensing... | 02/17/98 |
| 5,444,583 | Disk Drive Having On-Board Triggered... | 08/22/95 |
| 5,448,433 | Disk Drive Information Storage Device... | 09/05/95 |
| 5,208,556 | Phase Lock Loop For Sector Servo System | 05/04/93 |
| 5,642,244 | Method and Apparatus For Switching... | 06/24/97 |

Prior art FIG. 1 illustrates a disk/head assembly 12 and a preamplifier 14. The preamplifier 14 handles both read functions and write functions. Not illustrated in FIG. 1, for clarity, is the Magentoresistive (MR) head. The unshown MR head works through magnetic media and it has both functions, read and write, with a different portion of the head performing each function. The write function portion of the MR head is inductive and the read function portion of the head acts as a magnetic resistive element. A write occurs through an inductive element to the magnetic media disk assembly 12 and a read occurs by sensing the magnetic shifts in the disk assembly 12 by using the resistive read element. The preamplifier 14 connects to the unshown MR head.

Prior art magnetoresistive heads are described in the Background of Invention of U.S. Pat. No. 5,287,238 issued on Feb. 15, 1994 to Baumgart, et al of IBM. Baumgart presented a new type of MR head known as the giant magnetoresistance, GMR, head. The GMR head consists of a multilayered structure that has the magnetization directions of its outer layers of ferromagnetic material fixed, or pinned, while the magnetization direction of intermediate layer is free to rotate. GMR heads are further discussed in the following U.S. Patents:

| | | |
|---|---|---|
| 5,883,764 | Magnetoresistive Sensor Having... | Issued 03/16/99 |
| 5,856,897 | Self-Biased Dual Spin Valve Sensor | 01/05/99 |
| 5,880,913 | Antiparallel Pinned Spin Valve... | 03/09/99 |
| 5,867,351 | Spin valve Read Head With Low... | 02/02/99 |
| 5,859,754 | Mangetoresistive Transducer Having... | 01/12/99 |

Prior art FIG. 2 illustrates a portion of the read channel of preamplifier 14 of FIG. 1. The resistive portion of the unshown GMR head is represented by the resistor Rmr. Only one resistor is illustrated in the drawing. In typical mass storage devices of the HDD type, the preamplifier 14 may have as many as 1 to 8 channels. An initial amplification stage 18 of preamplifier 14 connects to the resistive portion Rmr of the GMR head. Later gain stages 20 of preamplifier 14 are connected to the outputs of initial amplification stage 18 at nodes M and N. The read path outputs flow from the later gain stages 20. The read channel selection inputs flow into preamplifier 14 from an unillustrated head select logic stage. Transistor M2 represents the read channel input enabling MOS transistor for head 0.

The architecture of initial amplification stage 18 of preamplifier 14 is constructed as that of a single ended amplifier as opposed to a differential amplifier; the single ended amplifier uses only one NPN bipolar transistor Q1 to set the voltage on the load side of later gain stage 20. (As is known to one of ordinary skill in the art of amplifier design, a differential amplifier uses two transistors to establish the voltages on the node M and N inputs to the differential amplifier 20.) On the RL load side of the single ended amplifier, the bias current Ib travels through the load resistor RL and through the collector of transistor Q1 to set the voltage on node M. On the constant voltage side of the single ended amplifier, the bias current Ib/ travels through the scaling reference resistor Ref to set the voltage on node N. In hard disk drives, because of linearity problems during a read operation, the voltage on the read head (represented by VRmr) is biased up to a certain level, which is typically around 0.2 to 0.5 volts. This bias voltage VRmr is established through a feedback loop created by transconductance amplifier 22 across nodes M and N whose output is connected to the base of transistor Q0 through MOS switch M2. This, in essence, creates a pseudo-balanced output on the reader load resistors such as would exist if a differential amplifier were used in the initial amplification stage 18.

In operation of prior art FIG. 2, when head 0 is selected by unillustrated head select logic circuitry (which establishes a current Imr on the gate of MOS transistor M2) NPN bipolar transistors Q0 and Q1 are on. Together with the load resistor RL, they form a cascode amplifier. A cascode amplifier is a high bandwidth amplifier. The transistor Q0 is a common base amplifier and the transistor Q1 acts as a common base amplifier. As the magnetic resistive head moves over data, the head resistance Rmr varies. This can be modeled by an alternating current ac signal in series with the Rmr resistor. The transistors Q0 and Q1 amplify this signal. The ac signal goes to the load resistor RL and to the node M input of latter gain stage 20 that is a differential amplifier. The other input of the amplifier 20 is node N that should be at a dc bias voltage equal to the voltage on the load resistor L1 node M. The node N constant voltage side of the later gain stage amplifier 20 should not have an alternating current signal on it. This is achieved by having a reference side of single ended initial amplification stage 18 that consist of transistor Q2 and the scaling resistor Ref. This supplies a current Ib/ through the scaling resistor Ref, which provides a voltage at node N. The transconductance amplifier 22 forms a feedback loop with the cascode amplifier Q0 and Q1. The purpose of the loop is to make sure that node M dc voltage on the signal side of the load resistor RL is the same as the dc voltage on node N. If the dc voltage on node M and node N are the same, the input voltages on differential amplifier 20 are the same. On node N, there is no ac signal; on node M there is an ac signal. If the dc voltages are equal, then the differential later gain stage amplifier 20 will amplify the ac signal and send it to further gain stages.

GMR heads offer the ability to increase the drive capacity of the read channel of the preamplifier significantly. However, the increased drive capability comes with a drawback as the magnetization orientation of the pinned layer can be damaged as the temperature of the GMR head rises. (Because more current flows through the read channel due to increased drive performance, the preamplifier circuitry heats up which in turn heats up the GMR head.) Incorrect magnetic orientation in the pinned layer gives rise to data read errors.

It is thus an object of the invention to provide a mechanism by which the magnetic orientation in the pinned layer of GMR heads can be restored to the correct orientation. Such restoration will reduce data read errors.

Other objects and advantages of the invention herein will be apparent to those of ordinary skill in the art having the benefit of the description herein.

SUMMARY OF THE INVENTION

The invention uses the preamplifier of a hard disk drive to establish a pinned layer reset pulse to restore the magnetic orientation of the pinned layer in MR heads. The existing capacitor which is part of the Gm loop of the initial amplification stage of the preamplifier is charged to establish the pulse voltage. The write current digital to analog converter sets the magnitude of charge on the capacitor. The head input transistor applies the charge to the Rmr element of the MR head. The width of the pulse is programmable as is the discharge rate. The read current digital to analog converter establishes the final nominal value of the pulse.

BRIEF DESCRIPTION OF DRAWINGS

FIG. 3 is a schematic drawing illustrating the preferred embodiment of an inventive pinned layer reset circuit according to the invention for an Ibias preamplifier.

FIGS. 4a–e are timing diagrams illustrating the operational characteristics of the pinned layer reset circuit of FIG. 3.

DETAILED DESCRIPTION OF PREFERRED EMBODIMENT

As will be explained in detail below, the method of the invention allows the pinned layer in a GMR read head to have its magnetic orientation restored to the correct position. The invention accomplishes this by applying a pinned layer reset pulse across the read head. The invention utilizes existing components in a preamplifier and adds minimal amount of circuitry thereto in order to keep cost down and to save die layout area. A customer of a semiconductor manufacturer may advantageously provide the pulse after assembling the preamplifier to the GMR head. The customer may program the magnitude of the pulse, the width of the pulse and the decay slew rate of the pulse. The method of the invention is suitable for preamplifiers designed as constant current Ibias preamplifiers (which keep a constant current across the MR head) and the invention is suitable for preamplifiers designed as constant voltage Vrmr preamplifiers (which keep a constant voltage across the MR head).

Figure 1:
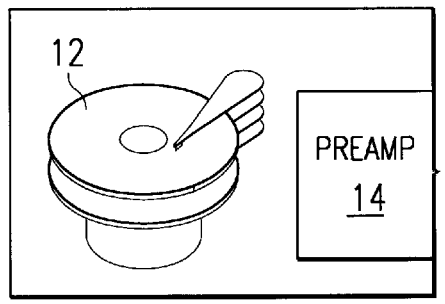
FIG. 1 is a prior art drawing illustrating a disk/head assembly and a preamplifier of a typical HDD device.
Figure 2:
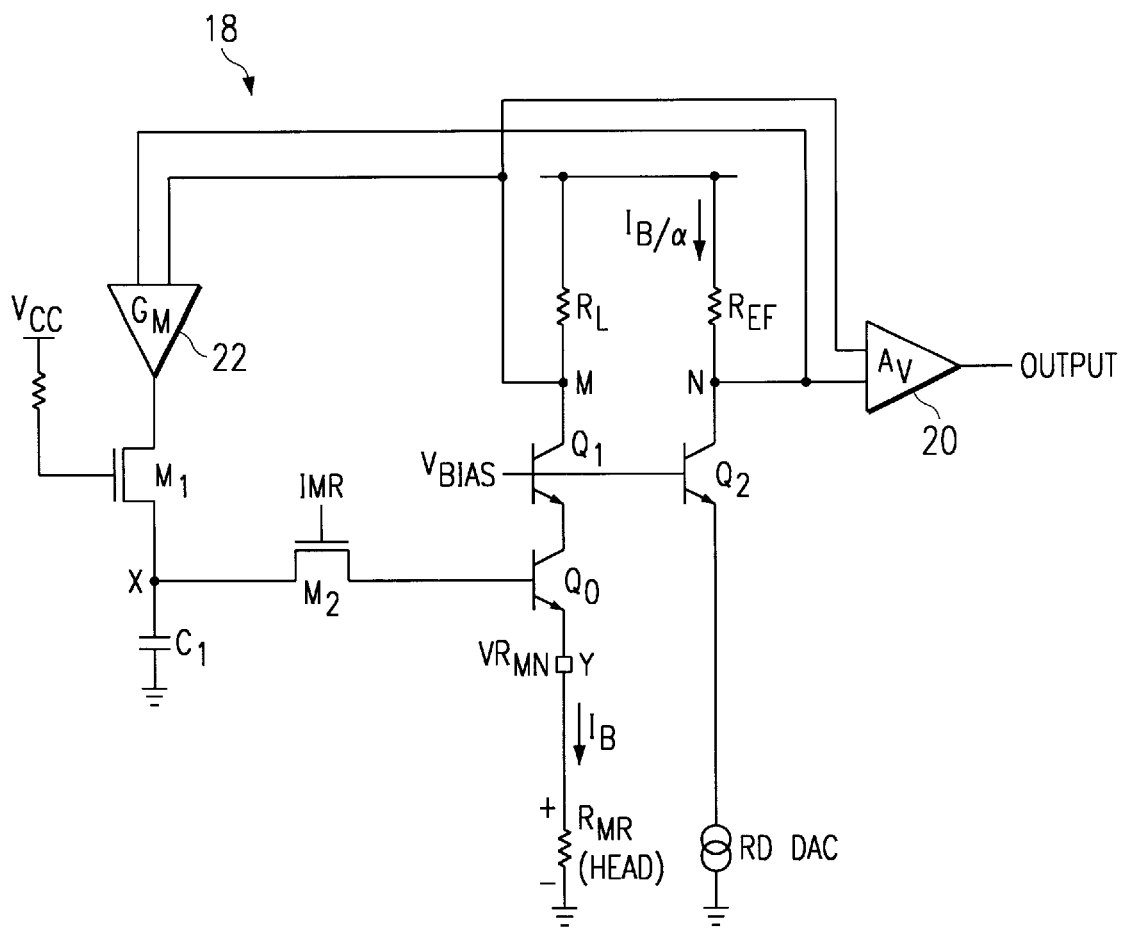
FIG. 2 is a prior art drawing illustrating the initial amplification stage of the preamplifier of FIG. 1.

By comparing the preferred embodiment of an inventive pinned layer reset circuit employing the method of the invention shown in FIG. 3 to prior art FIG. 2, details of the invention become apparent as like reference numerals are used in the figures. The preamplifier of FIG. 3 is designed as a constant current preamplifier. In FIG. 3, to obtain this reset pulse, a key component is using the existing capacitor C1 to charge the pulse voltage. Capacitor C1 may be either an internal (integrated) or an external capacitor. [Capacitor C1 is part of the Gm loop and its main purpose is to establish a lower corner cutoff frequency for the preamplifier. That is, it helps prevent DC signals and low frequency AC signals from being passed on in the read channel.] The MOS switch M2 applies the charged voltage to the base of NPN transistor Q0. If the base of transistor Q0 goes up, then the node Y (which is the GMR head) goes up very fast.

In FIG. 3, the write Digital to Analog Converter WR DAC sets the magnitude of the pulse so that the magnitude of the pulse is programmable. By setting bits in the WR DAC serial port, the customer may vary the amount of current. The W R DAC current goes through the resistor that establishes a voltage which varies depending upon the level of the WR DAC current. When MOS transistor M3 turns on, the voltage across the resistor R gets applied to the capacitor C1. This sets the voltage on the capacitor C1 to the correct pulse magnitude. Typical values for capacitor C1 would be 0.01 microfarads to 0.022 microfarads. With such values, the pulse magnitude may range from about 0.41 volts to about 1.48 volts depending upon the serial port bit selection.

With reference to the timing diagrams illustrated in FIGS. 4a–e, and with reference to FIG. 3, the operation of the inventive pinned layer reset circuit is explained. At time A, the pulse magnitude is established by enabling the pinned layer reset mode. To enable the reset mode, the signal Spt, which represents pinned layer reset enable serial port bit, is pulled high. This turns on MOS transistor M4 and the WR DAC current goes through the resistor R. However, at this time A, transistor M3 is off because current IMR bar (current to the MR head) is off. At time A, signal Spt is low, the current IMR is low, IMR bar is high which means that transistor M3 is off and transistor M4 is off.

At time B, signal Spt goes high. IMR bar stays high so both transistors M3 and M4 turn on. This current charges the capacitor C1. It keeps on charging until it reaches a peak voltage of IR. The voltage across capacitor C1 is given by the curve for FIG. 4d at node X. At the end of time period B, the capacitor C1 voltage is at the level of the desired pulse magnitude.

After time period B, the next step is time C wherein the pinned layer reset pulse is fired at node Y (FIG. 4e) which is the top of the GMR head. Previously, transistor M2 was off as there was no current IMR. At time C, IMR is turned on (to about 5 volts). This turns on transistor M2. The base of transistor Q0 rises to the voltage at node X. When this happens, the voltage across the head resistor Rmr goes up because the emitter of transistor Q0 is pulled up. This gives a very fast rise time of the voltage at node Y. NPN transistor Q3 is added to make sure that a base to emitter voltage drop exists across transistor Q0. The Vbe drop across transistor Q3 is equal to the Vbe drop across transistor Q0. Therefore, the voltage across Rmr at node Y is equal to the voltage across resistor R at node X. As long as this set up remains the voltage at node Y remains. The pulse width is programmable by choosing bits in a serial port of the preamplifier which affect the delay of signal IMR bar. Typical pulse widths range from 48 nanoseconds to 95 nanoseconds.

The next problem is how to bring the reset pulse down to the bias voltage Vbias. There are two methods to accomplish this. When the bias voltage is applied, the nature of the transconductance Gm 22 loop is such that if any imbalance exists between nodes M and N, the Gm adjusts the voltage at node X so that voltages at nodes M and N become equal. In FIG. 4e, when the pined layer reset pulse is applied to the GMR head at node Y, the voltage on the top of the GMR head across the resistor Rmr goes above Vbias to a peak voltage Vpk that is equal in value to IR. If Vbias is across Rmr, the current is equal to Vbias divided by Rmr. If the pulse exists, a voltage of Vpk exists and the current is Vpk/Rmr. Since Vpk is greater than Vbias, more current flows through the load resistor RL at node M, so node M is at a lower voltage level than node N. The Gm loop tries to make the voltage at node M be equal to the voltage at node N. It accomplishes this by lowering the voltage at node X. If the voltage at node X gets lowered, the voltage at node Y gets lowered and finally settles when nodes M and N are equal. At this point, node Y reaches the bias voltage.

In the other (usually used) operational mode, the Gm loop signal S indicates when an excessive voltage offset exists between nodes M and N. The signal S is enabled when the voltage at node M is less than the voltage at node N because too much current is flowing through the resistor Rmr. The Gm loop has a comparator that provides the signal S. When the signal S comes on, the base of transistor Q4 is pulled up. Signal S is a 5 volt signal. When the base of transistor Q4 is pulled up, transistor Q4 turns on and drives a lot of current from capacitor C1 to ground. This discharges the reset pulse. Region D in the timing diagram of FIG. 4 is the region where the pulse is discharged. The pulse was applied in region C and it takes a while to discharge. Signal S is does not turn on transistor Q4 immediately as signal S is delayed. It eventually turns on transistor Q4. As transistor Q4 is turned on, node X begins to discharge.

An advantageous feature of the reset pulse is that its slope, or discharge rate, is programmable. Due to somewhat varying characteristics of various GMR heads supplied by different vendors and the drive capabilities of various preamplifiers, the discharge rate of the pulse may be tuned most favorably for its application. This is accomplished by varying the discharge current. The current that is supplied to transistor Q4 is changed. The is accomplished by having the resistor R10 connected across MOS transistor M10. When transistor M10 is off, resistor R10 is added to the base connection of transistor Q4. When transistor M10 is on, resistor R10 is not added to the circuit. If resistor R10 is in the circuit, the current to transistor Q4 is less; transistor Q4 is not turned on as hard so it takes longer for the pulse to discharge. But, if the resistor R10 is shorted out by turning on transistor M10 (programmable by selecting bits in the serial port of the preamplifier), more current is applied on the base of transistor Q4; it is turned on harder and so the pulse falls faster.

The pulse will decay to ground potential (relative to GMR head ground) with a turn-off decay slew rate that can be set to one of four settings. By selecting bits of the serial port of the preamplifier, the pulse slope is controlled. The circuit uses a constant decay current so the resulting decay time is proportional to the voltage difference between the applied reset magnitude and ground potential. With capacitor C1 having a value of about 10 nanofarads, the decay slew rate varies between 11.9 volts/microsecond to 3.5 volts/microsecond. With capacitor C1 having a value of about 22 nanofarads, the decay slew rate varies between 6.8 volts/microsecond to 1.9 volts/microsecond.

Now in time region E of FIGS. 4a–e, the magnitude of reset pulse of FIG. 4e, should stop at the bias voltage Vbias. The circuit is constructed to allow the pulse to automatically stop at the correct voltage level. When the pulse decreases, the voltage at node X decreases. When it reaches the bias point, then the voltage at node M equals the voltage at node N. The proper bias is always set by the current from the read Digital-To-Analog Converter RdDAC which establishes a voltage across reference resistor Rref. When node M equals node N at proper bias, the transconductance amplifier Gm 22 turns off the signal S without delay. (The transconductance amplifier is constructed so that together with transistor M11 the signal S is delayed when it turns on and the signal S is not delayed when it turns off.) Transistor Q4 is immediately turned off. The capacitor C1 stops discharging and node X stabilizes at Vbias which causes node Y to stabilize at Vbias. Of course, the nominal voltage at which the pulse settles could be zero or any other desired value, Vbias being chosen as an exemplary example.

Transistor M11 aids to begin discharging the reset pulse. When the current IMR goes up at time C, the reset pulse gets applied in FIG. 4e. After a fixed delay of current IMR which establishes the pulse width, the voltage at node Z goes down. When node Z goes down, the voltage at node Z1 goes up, which turns on transistor M11 and applies a 5 volt signal to transistor Q4 to begin pulse discharge at time D. The pulse is fired at time C with the signal IMR going high. Then, after a certain delay, node Z goes down and node Z1 goes up. MOS transistor M11 turns on and this brings up the base of transistor Q4 which in turn starts discharging capacitor C1. This begins the time period D. So, in essence, the turnoff time for IMR bar is delayed at node Z which allows for the reset pulse width to be programmed.

Figure 5:
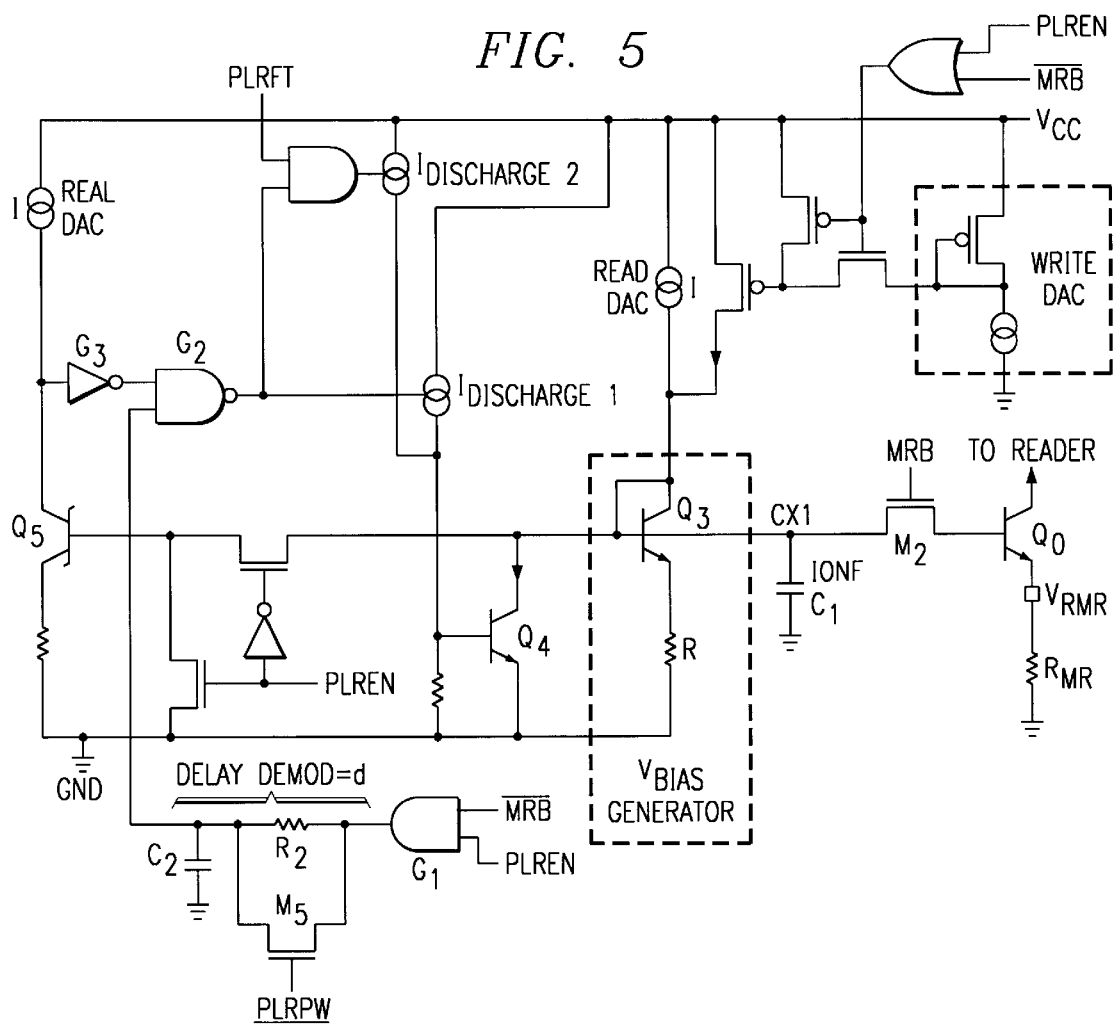
FIG. 5 is a schematic drawing illustrating the preferred embodiment of an inventive pinned layer reset circuit according to the invention for a Vbias preamplifier.

As described above the, the circuit of FIG. 3 is particularly useful for preamplifiers designed as Ibias preamplifiers. Such preamplifiers keep a constant Ibias current through the MR head. Regardless of the actual resistance of the MR element (which may vary from head to head), Ibias preamplifiers keep the Ibias current constant. Another type of preamplifier is known as Vbias preamplifiers. These preamplifiers are designed to keep a constant voltage across the MR head. The electrical schematic diagram of FIG. 5 represents a pinned layer reset circuit for Vbias preamplifiers. The principal method of establishing the pinned layer reset pulse (as explained with reference to the Ibias preamplifier of FIGS. 3 and 4) applies to the Vbias preamplifier of FIGS. 5 and 6, although the actual circuitry employed varies somewhat.

By comparing FIG. 5 to FIG. 3, similarities of the circuits are readily seen as like reference numerals are utilized. In FIG. 5, transistor Q0 is the input transistor and capacitor C1 is the capacitor which may either be an internal (integrated) or an external capacitor. In operation, the base of transistor Q0 is raised up so that a voltage is established across the MR head. The way the pulse is applied is the same as in FIG. 3. The pulse magnitude is established by charging capacitor C1.

Figure 6:
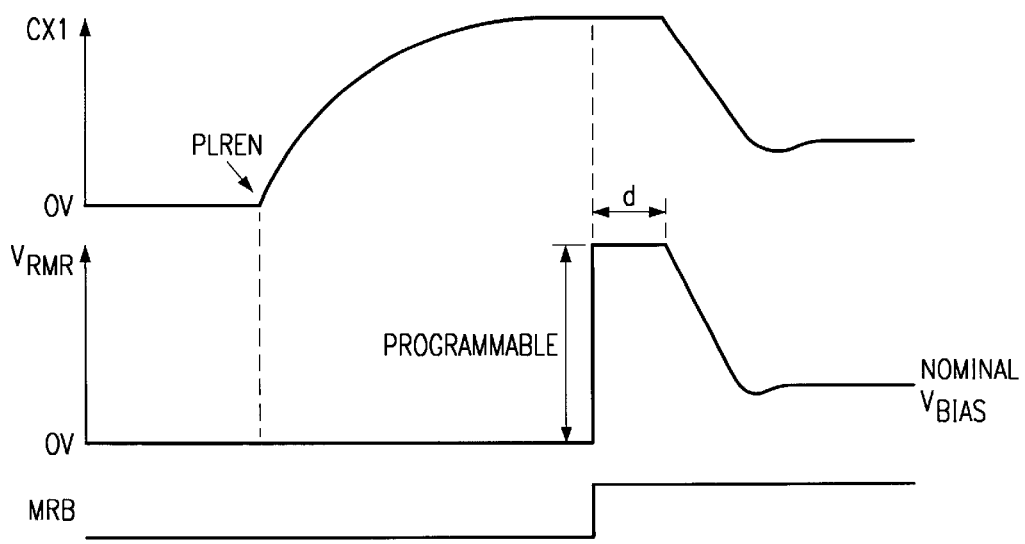
FIG. 6 is a timing diagram illustrating the operational characteristics of the pinned layer reset circuit of FIG. 5

With reference to the timing diagrams of FIG. 6 and with reference to FIG. 5, the operation of the Vbias preamplifier of FIG. 5 is explained. The pin layer reset enable pulse, PLREN, is activated. The write DAC current is fed to transistor Q3 and to resistor R to create a voltage across resistor R which charges capacitor C1. Then, signal MRB is turned on which applies the pinned layer reset pulse. The transistor M2 turns on and the voltage across resistor R gets applied to transistor Q0 which turns on and applies the voltage of capacitor C1 to the MR head. After a while, the pulse should come down to the nominal voltage Vbias. This is accomplished by discharging capacitor C1. The signal MRB is applied to logic gate G1 that toggles in polarity. There is a resistor/capacitor delay formed by resistor R2 and capacitor C2. So that after a delay, the logic gate G2 gets flipped which turns on the current source I discharge1. This current goes to the base of transistor Q4 that turns on. Transistor Q4 discharges capacitor C1. The discharge rate, or slope, of capacitor C1 is programmable by turning on the bit PLRFT (which would typically be accessed through the serial port of the preamplifier). This bit turns on the current source I discharge2 that is applied to the base of transistor Q4 and turns it on harder. Thus, the discharge rate of transistor Q4 is determined by the amount of current flowing into its base. The more current, the harder Q4 turns on and the faster the discharge rate of capacitor C1 and the faster the voltage across the MR head falls to the level Vbias. The discharge should be turned off when nominal Vbias is achieved. Schottky transistor Q6 is conducting a lot of current before the discharge occurs. Schottky transistor Q6, in effect (with the help of logic gates G3 and G2), compares the actual current flowing in transistor Q3 to the current that will flow into Q3 when nominal Vbias is reached. The nominal Vbias current is set by the read DAC. The moment the actual current in transistor Q6 (same as current through transistor Q3) equals the current set by the read DAC, the discharge stops, i.e., when the proper Vbias is reached, discharging stops. The fall time of the pulse is programmable by setting the discharge current. The delay which affects the width of the pulse is programmable by applying signal PLRPW to MOS transistor M5. The pulse height is programmable by changing the current from the write DAC.

While the invention has been particularly shown and described by the foregoing detailed description, it will be understood by those skilled in the art that various other changes in form and detail may be made without departing from the spirit and scope of the invention as defined by the following claims.

What is claimed is:

1. A method of resetting the orientation direction of a pinned layer in a magnetoresistive head, comprising the steps of:

Connecting a preamplifier to a magnetoresistive head, the preamplifier having an initial amplification stage with a transistor output coupled to the head and a capacitor coupled to the input of the transistor such that the capacitor establishes the lower cutoff frequency for the preamplifier;

Charging the capacitor to a desired pinned layer reset voltage while maintaining the transistor output connection to the head;

Applying the pinned layer reset voltage of the charged capacitor to the magnetoresistive head to reset the orientation direction of the pinned layer; and Removing the pinned layer reset voltage from the magnetoresistive head by discharging the capacitor.

2. The method of claim 1 wherein the desired pinned layer reset voltage is programmable by varying current from a write digital to analog converter of the preamplifier.

3. The method of claim 2 wherein the preamplifier transistor connected to the magnetoresistive head is a bipolar transistor.

4. The method of claim 3 wherein the pinned layer reset voltage has a pulse width that is programmable.

5. The method of claim 4 wherein the pinned layer reset voltage has a discharge rate that is programmable.

6. The method of claim 5 wherein the step of discharging the capacitor occurs by turning on a transistor connected between the capacitor and ground.

7. The method of claim 6 wherein the step of discharging the capacitor discharges the pinned layer reset voltage to a value that is established by a read digital to analog converter of the preamplifier.

8. The method of claim 7 wherein the value established by the read digital to analog converter is equal to the bias voltage value maintained on the magnetoresistive head by the preamplifier.

9. The method of claim 6 wherein the step of turning on a transistor connected between the capacitor and ground includes changing the capacitor discharge rate by changing the amount the transistor is turned on through serial port control.

* * * * *